US011115211B2

(12) United States Patent
Norman et al.

(10) Patent No.: US 11,115,211 B2
(45) Date of Patent: Sep. 7, 2021

(54) SECURE CONTAINER PLATFORM FOR RESOURCE ACCESS AND PLACEMENT ON UNMANAGED AND UNSECURED DEVICES

(71) Applicant: APPBUS, INC., Wenonah, NJ (US)

(72) Inventors: Tyler Norman, Brooklyn, NY (US); Anthony Pizi, Wenonah, NJ (US); Yuri Milshtein, Edison, NJ (US); Paul Kanevsky, West Windsor, NJ (US); Andrew Melikov, Fair Lawn, NJ (US)

(73) Assignee: BA INSIGHT, LLC, Boston, MA (US)

( * ) Notice: Subject to any disclaimer, the term of this patent is extended or adjusted under 35 U.S.C. 154(b) by 98 days.

(21) Appl. No.: 15/572,236

(22) PCT Filed: May 6, 2016

(86) PCT No.: PCT/US2016/031300
§ 371 (c)(1),
(2) Date: Nov. 7, 2017

(87) PCT Pub. No.: WO2016/179536
PCT Pub. Date: Nov. 10, 2016

(65) Prior Publication Data
US 2018/0123795 A1 May 3, 2018

Related U.S. Application Data

(60) Provisional application No. 62/158,337, filed on May 7, 2015.

(51) Int. Cl.
H04L 29/06 (2006.01)
H04L 9/32 (2006.01)
(Continued)

(52) U.S. Cl.
CPC ............ H04L 9/3226 (2013.01); G06F 9/452 (2018.02); G06F 21/33 (2013.01); G06F 21/629 (2013.01);
(Continued)

(58) Field of Classification Search
CPC ....................................................... H04L 9/32
See application file for complete search history.

(56) References Cited

U.S. PATENT DOCUMENTS 5,878,258 A 3/1999 Pizi et al.
8,850,525 B1 9/2014 Wilkinson et al.
(Continued)

OTHER PUBLICATIONS

International Patent Application No. PCT/US2016/031300, International Search Report and Written Opinion dated Aug. 8, 2016, 9 pages.
(Continued)

Primary Examiner — Taghi T Arani
Assistant Examiner — Lin Chang
(74) Attorney, Agent, or Firm — Morgan, Lewis & Bockius LLP

(57) ABSTRACT

A first computing device receives a service access request to access a service provided by another computing device, the request including user authentication characteristics of a user. The first computing device forwards the service access request to the other computing device. The first computing device receives a user interface configuration file from the other computing device, that, when executed by the second computing device, enables the second computing device to display a user interface that provides access to the service. The first computing device modifies the user interface configuration file based on the user authentication characteristics to provide selective access to the service. The first computing device transmits the modified user interface configuration file to the second computing device, that,
(Continued)

when executed by the second computing device, enables the second computing device to display a modified user interface that provides selective access to the service.

13 Claims, 16 Drawing Sheets

(51) Int. Cl.
G06F 21/33 (2013.01)
G06F 21/62 (2013.01)
G06F 9/451 (2018.01)
H04L 9/14 (2006.01)

(52) U.S. Cl.
CPC .............. *H04L 9/14* (2013.01); *H04L 63/00* (2013.01); *H04L 63/029* (2013.01); *H04L 63/0428* (2013.01); *H04L 63/0823* (2013.01); *H04L 63/102* (2013.01); *H04L 63/168* (2013.01)

(56) References Cited

U.S. PATENT DOCUMENTS

| 2002/0029296 | A1 | 3/2002 | Anuff et al. |
| 2003/0046539 | A1 | 3/2003 | Negawa |
| 2006/0106897 | A1* | 5/2006 | Sapozhnikov ............ G06F 8/38 |
| 2006/0265386 | A1 | 11/2006 | Richter |
| 2007/0078705 | A1* | 4/2007 | Abels ................. G06Q 30/0601 |
|  |  |  | 705/26.1 |
| 2009/0031230 | A1 | 1/2009 | Kesler |
| 2010/0262703 | A1 | 10/2010 | Faynberg et al. |
| 2011/0209064 | A1 | 8/2011 | Jorgensen et al. |
| 2012/0005334 | A1* | 1/2012 | Raja ........................ H04L 67/02 |
|  |  |  | 709/224 |
| 2013/0261611 | A1 | 10/2013 | Dhar et al. |
| 2014/0007183 | A1* | 1/2014 | Qureshi ................... G06F 8/53 |
|  |  |  | 726/1 |
| 2014/0108794 | A1 | 4/2014 | Barton et al. |
| 2014/0122875 | A1* | 5/2014 | Pizi .................... G06F 21/6209 |
|  |  |  | 713/164 |
| 2014/0297861 | A1 | 10/2014 | Qureshi |
| 2014/0304689 | A1 | 10/2014 | San Jose |

OTHER PUBLICATIONS

European Patent Application No. 16790189.1, Extended European Search Report, dated Sep. 27, 2018, 12 pages.
Office Action for corresponding European Patent Application No. 16790189.1 dated Jun. 25, 2019, 12 pages.

* cited by examiner

| Info | Search | Retirement | Activities | Accounts | Gains/Losses | Proposal | Performance | Profile | Portfolio Review | Billing (3270) | Summary | Order Entry | Contact Management |

Utility Billing Inquiry System UTL_B_123121
Date: 02/24/09                                                       Terminal: T0012
Hour: 09:40

Account Detail
****************

Account:  123121
Status:   Active                         Type:  Service

Customer: 554-877-6721
          Karen Burkhardt
          7222 E Tanque Verde Rd
          Tucson                    AZ    85715

Curr Bal  Due Date   Pay Amt  Last Pay   # Days  Curr Read  Prev Read  Rate     Usage
=======  ========  =======  ========  ======  =========  =========  =====    =======
133.06   03/10/09   150.00   02/10/09     32      33912      32772   .11672   1140kWh PF3 = Main Menu    PF4 = Logoff
                                                                                01/01

FIG. 8F

SECURE CONTAINER PLATFORM FOR RESOURCE ACCESS AND PLACEMENT ON UNMANAGED AND UNSECURED DEVICES

CROSS-REFERENCE TO RELATED APPLICATIONS

This application is a U.S. National Phase Application under 35 U.S.C. 371 of International Application No. PCT/US2016/031300 filed May 6, 2016, which claims the benefit of U.S. Provisional Patent Application No. 62/158,337 filed May 7, 2015 entitled "MULTI FORM FACTOR CONTROL PLANE", all of which are incorporated herein by reference in their entireties.

BACKGROUND

The present invention generally relates to remote access to resources via a computer network and, more particularly, to a method and system for providing remote access to resources via a computer network.

Most, if not all corporations today implement a computer network to provide access to its computing services. To connect to these services, corporate employees are generally required to connect within the computer network, or, if connecting externally, are required to create a virtual private network. In addition, the corporate employees are generally required to use a device that executes the same operating system as the corporate servers hosting the computing services.

Corporate employees demand to have access to applications and business data normally available only within the corporate network from an un-trusted and un-secured device residing in an un-trusted and un-secured environment. For example, the corporate employee may want to operate on a personal laptop, tablet, or smart phone and have access the corporate email or document management system. Over time many types of end user computing and communication have become part of the consumer ecosystem and marketplace. There are many user device types which encompass a wide range of variations including differences in operating systems, hardware in multiple form factors, which embrace disparate hardware and/or software facilities, etc. This provides a wide range of target devices for which a new type of capabilities are requires. In a conventional enterprise, the wide mix of traditional applications used by many organizations (e.g., CRM, administration systems, mail, web based, device specific applications and others) are incapable of being deployed or optimized for the end user based on the devices of their preference, generally referred to as Bring Your Own Device (BYOD).

This creates a scenario where the owners of these devices have an impaired ability to utilize these applications on their devices. In addition, the applications that these users need to access to perform the duties of their job are not able to contextually operate together to enhance the users capabilities to perform their job effectively and efficiently. They need to have the capability to share application and organization data and processes in real-time on any device.

SUMMARY

In one embodiment there is a method of selectively providing a customized graphical user interface, the method comprising: at a first computing device: receiving a service access request from a second computing device to access one or more services provided by a third computing device, the request including an authentication characteristic of a user of the second computing device; forwarding the service access request to the third computing device; receiving a user interface configuration file from the third computing device, wherein the user interface configuration file is configured to be executed by the second computing device to enable the second computing device to display a user interface that provides access to the one or more services; modifying the user interface configuration file based on the user authentication characteristics to provide selective access to the one or more services; transmitting the modified user interface configuration file to the second computing device, wherein the modified user interface configuration file is configured to be executed by the second computing device to enable the second computing device to display a modified user interface that provides selective access to the one or more services.

In a further embodiment, the second computing device is a client device and the third computing device is a virtual desktop infrastructure server.

In a further embodiment, the request includes computing device characteristics of the second computing device, the method further comprising: modifying the user interface configuration file based on the computing device characteristics of the second computing device.

In a further embodiment, the computing device characteristics include at least one of: i) an operating system of the second computing device and ii) display screen form factor characteristics of the second computing device.

In a further embodiment, the first computing device receives the service access request and transmits the modified user interface configuration filed to the second computing device using the secure hypertext transfer protocol (HTTPS).

In a further embodiment, the method further comprising: displaying, at the second computing device using a secure container, the modified user interface that provides selective access to the one or more services.

In a further embodiment, the method further comprising: storing, at a local storage of the second computing device, data provided by the user via the modified user interface; and accessing, at the local storage of the second computing device, data requested by the user via the modified user interface, wherein the local storage is encrypted.

In a further embodiment, the method further comprising: executing an application that displays a local application user interface at the second computing device; and displaying the local application user interface at the second computing device using the secure container.

In a further embodiment, the method further comprising: storing, at a local storage of the second computing device, data provided by the user via the local application user interface; and accessing, at the local storage of the second computing device, data requested by the user via the local application user interface, wherein the local storage is encrypted.

In a further embodiment, providing selective access the one or more services including at least one of: i) restricting access to a feature of the one or more services and ii) restricting access to at least one service of the one or more services.

In a further embodiment, the method further comprising: invoking an encrypted session between the first computing device and the second computing device by providing an encrypted session key to the second computing device, wherein the encrypted session key is unique to the encrypted session.

In a further embodiment, the method further comprising: storing, at a local storage of the second computing device using the encrypted session key, data provided by the user via the modified user interface; and accessing, at the local storage of the second computing device using the encrypted session key, data requested by the user via the modified user interface.

In a further embodiment, the method further comprising: deleting the encrypted session keys upon discontinuation of the encrypted session.

In one embodiment, there is provided a non-transitory computer readable storage medium having stored thereon computer-executable instructions which, when executed by a processor at a first computing device, perform the steps of any of the preceding embodiments.

In one embodiment, there is provided a system comprising: at a first computing device: one or more memory units each operable to store at least one program; and at least one processor communicatively coupled to the one or more memory units, in which the at least one program, when executed by the at least one processor, causes the at least one processor to perform the steps of any of the preceding embodiments.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIGS. 8A-8H illustrates exemplary screenshots of the container, in accordance with at least some embodiments of the invention.

DETAILED DESCRIPTION

Figure 1:
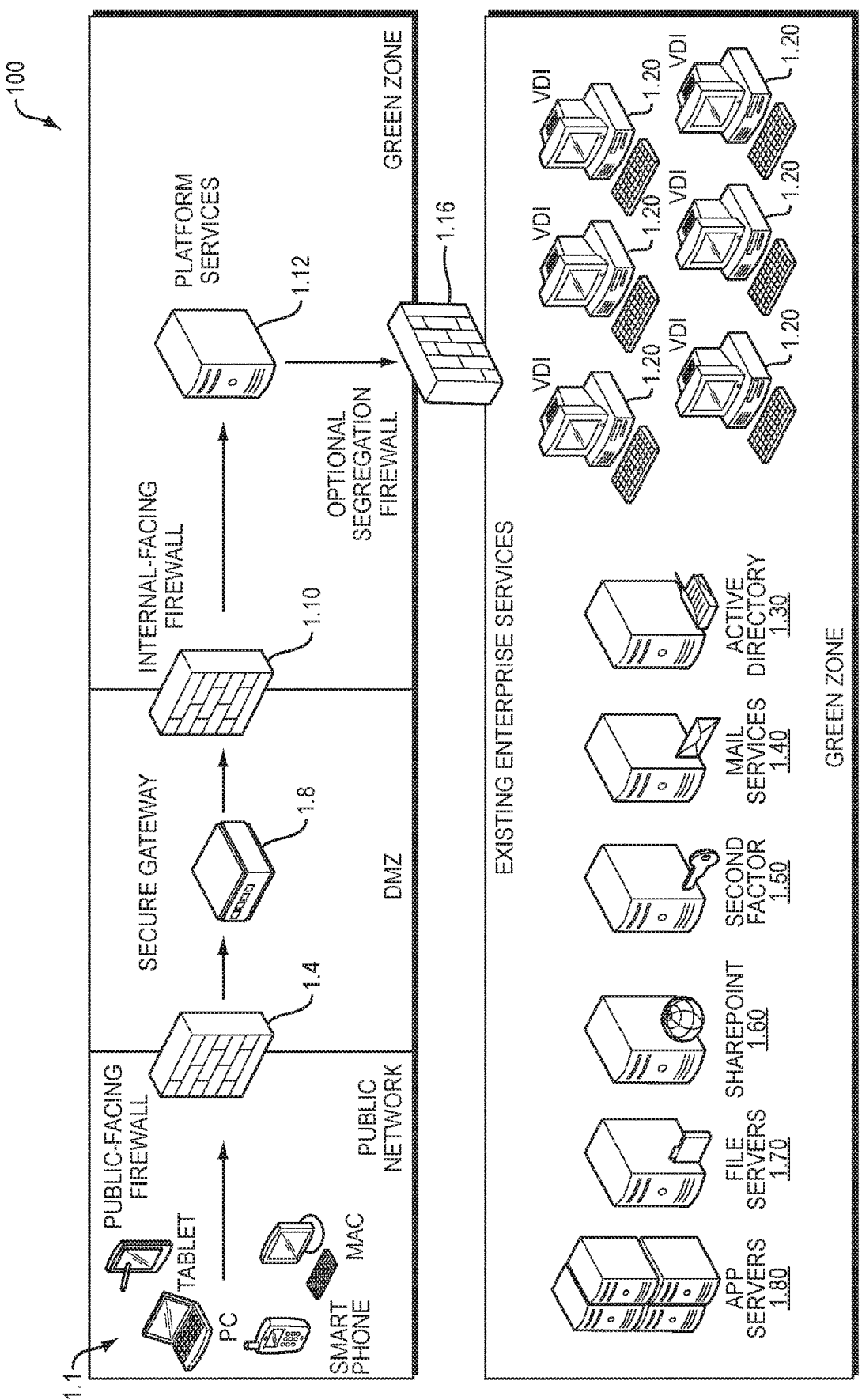
FIG. 1 is a block diagram of an exemplary system configured to facilitate container-based management at an un-secure and un-trusted user device, in accordance with one or more embodiments.

An objective of at least some embodiments of the invention is to provide users (e.g., employees of a company) with a user-friendly operating environment for their personal devices while also providing non-invasive integration with existing applications or corporate enterprise systems. In these embodiments, enterprises (e.g., Insurance Companies, banks, brokerages, hospitals, retailers, and/or other enterprises) can build competitive technical advantage by providing their applications, data, services and functionality to all of their constituencies (e.g. employees, contractors, independent agents, customers, employees, and different channels, etc.), through a number of different channels, the number of different channels is often minimized by their responsibility to secure and guard highly confidential customer and financial data in categories that cover PCI, HIPAA and other data security standards. By allowing user to utilize their personal devices, productivity and user satisfaction can be improved. In these embodiments, it is the enterprises' responsibility to maintain a level of security that makes sure that the device has the capabilities to protect confidential information even in cases where the device may be lost, stolen or broken.

Referring to the drawings in detail, wherein like reference numerals indicate like elements throughout, there is shown in FIGS. 1-9, systems and methods to provide access to remote applications on unsecured devices, in accordance with some embodiments of the invention.

System Functionality

FIG. 1 is a block diagram of an exemplary system configured to facilitate container-based management at an un-secure and un-trusted user device, in accordance with one or more embodiments.

In some embodiments, the system 100 includes one or more enterprise services 1.20-1.80. The enterprise services 1.20-1.80 each execute a computer application to implement one or more services provided to other devices (e.g., user device 1.1). In some embodiments, the enterprise services 1.20-1.80 provide a graphical user interface (GUI) configuration file to the other devices. The GUI configuration file, when executed, displays a GUI on the other devices.

One example of an enterprise service is a virtual desktop infrastructure (VDI) server 1.20. The VDI server 1.20 provides other devices with remote access to a virtual desktop hosted on the VDI server 1.20. In these embodiments, the VDI server 1.20 generates a GUI configuration file for display on other devices as a virtual desktop. In some embodiments, the virtual desktop may provide access to one or more services provided by the one or more enterprise services 1.30-1.60. In some embodiments, VDI servers 1.20 include a VDI pool manager that manages VDI session allocation to all active user devices to ensure the best performance on login and to deliver enterprise applications to the other devices.

Other examples of enterprise services include user directory 1.30, mail services 1.40. Second factor server 1.50, SHAREPOINT® server 1.60, file servers 1.70 and application servers 1.80. User directory 1.30 stores directory data for different users of enterprise services and manages communication between users and services, including user logon processes, authentication, and directory searches. Mail services 1.40 receives and processes incoming and outgoing email from users. Second factor server 1.50 performs authentication. SHAREPOINT® server 1.60 hosts configuration management applications. File servers 1.70 provides a storage location for shared storage access by other devices. Application servers 1.80 provide a server environment to execute internet-based applications.

In some embodiments, the system 100 includes one or more user devices 11 (e.g., edge devices). In some embodiments, a user device 1.1 accesses the virtual desktop provided by a VDI server 1.20 and/or access one or more services or data (e.g., streaming video, image, multimedia) provided by an enterprise service (e.g., enterprise services 1.30-1.60). The user device 1.1 includes a display that displays data from the one or more enterprise services (1.20-1.80) (e.g., a virtual desktop) to a user. Examples of user devices 11 include a laptop, a tablet, a smart phone, and a personal computer. In some embodiments, at least some of the user devices 11 execute the same operating system (e.g., WINDOWS, iOS) or different operating systems.

In some embodiments, the user device 1.1 includes a container executed locally on the user device 1.1 to access and display the virtual desktop. As used herein, a container may be an application that, when executed by the user device 1.1, processes a GUI configuration file (e.g., XML file) to render a user interface on the display of the user device 1.1.

There are a number of examples of how a user may utilize the functionality of the container. In one example, an employee of a corporation may need access to corporate resources, including email, calendar, contacts, documents, intranet sites, training materials from a personal device (i.e., user device 1.1), including, but not limited to an IPAD®, a WINDOWS® laptop, an ANDROID® smart phone, or a MAC® notebook. In one implementation, such an employee will download and install the container on any of the supported platforms of a user device 1.1, and then will gain access to the entitled corporate resources by providing the appropriate corporate credentials. Once installed, the container on user device 1.1 manages all security and policy enforcement functions, as well as the placement and interaction model that is configured by the corporate policy server. The container may also implement the security isolation layer that is enforced between all corporate applications running inside the container and the user device 1.1. The isolation is enforced on all storage access, so as to intercept and redirect all requests from corporate applications to a secure, encrypted store provided by the container, as well as, all network requests made by such applications in order to secure and encrypt all network communications between corporate applications and the appropriate corporate servers, whether residing inside the corporate firewall, or outside.

The container further includes navigation functionality as well as multiple application viewer archetypes, supporting the plurality of applications that may be required by a corporate employee. Examples of archetypes include: a secure and managed web browser, a virtualized WINDOWS® application, a secure RSS reader, a secure document viewer with off-line capability, and a controller for device-native applications created to run on the user device 1.1. The navigation functionality and viewer archetypes allows a user to seamlessly access and navigate between different types of applications provided by different enterprise services 1.20-1.80, as well as other third-party content providers (e.g., publicly-available websites).

In some embodiments, the system 100 includes a secure gateway 1.8. The secure gateway 1.8 validates and authenticates a user accessing one or more services 1.20-1.80. This functionality is further illustrated in FIGS. 3-4.

In some embodiments, the system 100 includes platform services component 1.12. The platform services component 1.12 modifies the functionality of the one or more services 1.20-1.80 on the user devices 1.1 so that the one or more services 1.20-1.80 can be provided to more devices and accessed by more users. In these embodiments, the platform services component 1.12 modifies GUI characteristics specified in a graphical user interface (GUI) configuration file to improve the display of the graphical user interface on a user device 1.1.

There are a number of different benefits realized by implementing any of the embodiments of the platform services component 1.12, described herein. For example, by modifying the GUI configuration files, a custom application written for the enterprise for a first device type can be "wrapped" inside the container of a second device type (different from the first device type) to display the GUI of the custom application.

The platform services component 1.12 may modify the GUI configuration file for a number of different factors, including user authentication characteristics of the user and device characteristics.

Regarding user authentication characteristics, in some embodiments, the platform services component 1.12 may restrict access to one or more services 1.20-1.80 or one or more features of one or more services 1.20-1.80 based on user authentication characteristics. For example, a first user may have full privileges to access all of the one or more services 1.20-1.80 while a second user may only have privileges to access service 1.20. In these embodiments, the platform services component 1.12 evaluates the user authentication characteristics of the first and second user. The platform services component 1.12 may then provide full access by the first user to the one or more services 1.20-1.80, while restricting access by the second user to one or more services 1.30-1.80 based on the evaluation results.

Regarding device characteristics, in some embodiments, the user device 1.1 may have a different graphical user interface characteristics (e.g., display form factor) as compared to the GUI characteristics specified in the GUI configuration file provided by the one or more enterprise services 1.20-1.80 (e.g., VDI server 1.20). In these embodiments, the platform services component 1.12 modifies the GUI characteristics specified in the GUI configuration file from the one or more services 1.20-1.80 based on the device characteristics to facilitate rendering a better GUI on the user device 1.1.

In some embodiments, the system 100 may include one or more firewalls. For example, the system 100 may include: a firewall 1.4 positioned between the user devices 1.1 and the secure gateway 1.8; a firewall 1.10 positioned between the secure gateway 1.8 and the platform services component 1.12; and a firewall 1.16 positioned between the platform services component 1.12 and the enterprise services 1.20-1.80. Each of the firewalls 1.4, 1.10 and 1.16 represent different layers of access to a network of a company. For example, firewall 1.4 represents access from an external company network to a demilitarized zone (DMZ) of an internal company network. Firewall 1.10 represents access from the demilitarized zone (DMZ) to the internal company network. Firewall 1.16 represents access from an internal company network to the enterprise services 1.20-1.80.

In some embodiments, the components of the system 100 transmit and receive data to and from each other using Secure Hypertext Transfer Protocol (HTTPS) tunneling. The secure tunnel leverages Enterprise Authentication and Entitlement systems to establish a communication channel. In some embodiments, the system 100 uses client side certificate and server side certificate pinning to eliminate the risk of traffic interception and "Man in the Middle" attacks. In some embodiments, secure and un-secure requests from web-based and native applications running inside a container at user device 1.1 are intercepted and routed through the secure HTTPS tunnel. In some embodiments, user device 1.1 attaches a cryptographic authentication token (OAuth2) to every data request to validate request authenticity. Secure gateway 1.8 enforces enterprise rules and restrictions when a component of the system 100 attempts to access internal and external resources of the system 100 or transmit data between internal and external components of the system 100. In some embodiments, the system 100 provides additional level of control through the use of resource Whitelists. In some embodiments, secure gateway 1.8 invokes application and data channel idle timeouts to ensure that an unattended session between a user device 1.1 and an enterprise service 1.20-1.80 will be automatically terminated.

In some embodiments, the system 100 provides a secure supporting infrastructure within a corporate network accessible via a set of secure, centrally managed container applications installed on a plurality of user devices 1.1. In these embodiments, users access and use corporate resources (e.g., corporate data and applications) from any potentially untrusted device without risk of data leakage or information loss. In these embodiments, a corporate network server manages the placement of resources, and enforces a variety of corporate policies. Examples of corporate policies include entitlements, authentication, session management, workflow integration, data protection, and resource permissions, among others. In some embodiments, the system 100 applies corporate policies by authenticating users of user devices 1.1 using existing corporate credentials system to the corporate network. In these embodiments, user credentials are collected and securely passed to a corporate authentication system. If the user authentication is successful, the system 100 provides a previously-untrusted user device 1.1 with access to the corporate intranet resources. After authentication, the secure gateway 1.8 and platform services component 1.12 retrieve policy and placement configurations specific to the authenticated and connected user of the user device 1.1 to enforce configuration policies through a container policy enforcement system.

In some embodiments, the system 100 provides for secure access to corporate resources including corporate email, calendar, contacts, file sharing and document management resources from an untrusted user device 1.1 by establishing a connection with corporate enterprise services server 1.20-1.80 (e.g., email server 1.40) on behalf of the user. In some embodiments, the container on user device 1.1 enforces encryption and security for all corporate information retrieved from the corporate network. In some embodiments, the container on user device 1.1 also provides an automated management system for remote erasure of such information from the user device 1.1 in the event that the user device 1.1 is compromised (e.g., lost, or employee terminated or entitlement loss).

In some embodiments, a user device 1.1 exchanges data with an enterprise service 1.20-1.80 as follows. Initially, a user device 1.1 sends a request through a public network firewall 1.4 to a secure gateway 1.8. The secure gateway 1.8 forwards the service request through an internal facing firewall 1.10 to platform services component 1.12. The request is then forwarded to existing enterprises services 1.20-1.80 through the segregated firewall 1.16 (optional). In some embodiments, the flow of the request is the same regardless of the enterprise service being requested. This example is representative of public access into the green zone of an enterprise. In these embodiments, the user device 1.1 is connected to the internet using a commercial broadband provider. The user device 1.1 connects over a secure https session into the DMZ of the enterprise to send a request. The request is then forwarded through a secure gateway 1.8 into the green zone through the firewall 1.10 using another secure https session to the platform services component 1.12. Connectors of the platform services component 1.12 connect the functionality of the existing enterprise services 1.20-1.80 in the green zone to the platform services component 1.12. This connection includes access to the application server 1.80, file server 1.70, document server 1.60, Second Factor authentication server 1.50, Mail server 1.40 and Active directory 1.30, etc. and Virtual Windows sessions 1.20.

Figure 2:
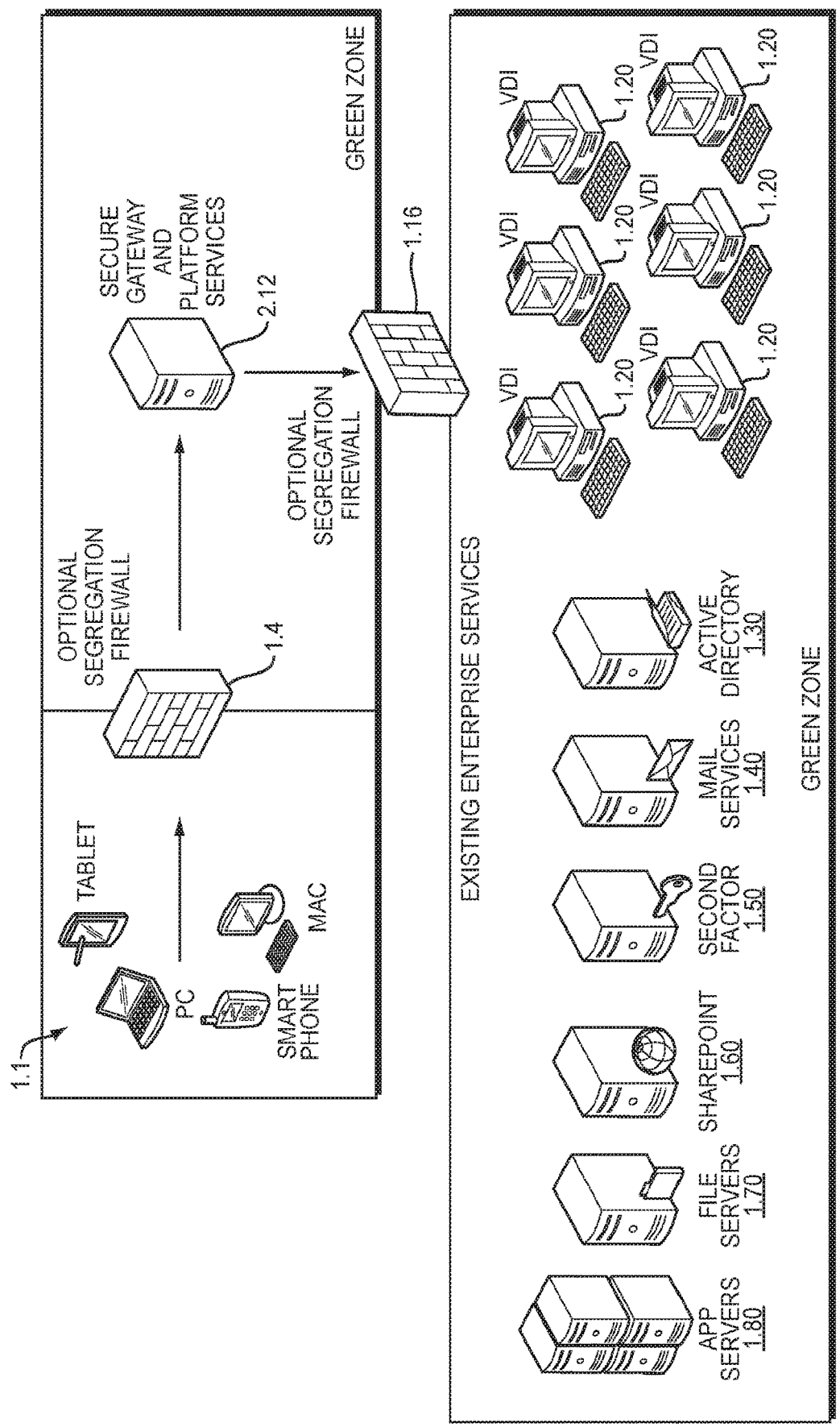
FIG. 2 is a block diagram of an exemplary system configured to secure a user device (e.g., an edge device) within an internal network (e.g., intranet), according to at least some embodiments of the invention.

FIG. 2 is a block diagram of an exemplary system configured to secure a user device (e.g., an edge device) within an internal network (e.g., intranet), according to at least some embodiments of the invention. In these embodiments, the system 100 allows the securing of the devices within a corporation, for example. In these embodiments, the user is connecting through an internal user device 1.1 through an optional segregated firewall 1.4 over the intranet. The user device 1.1 transmits a request from the user to platform services component 2.12. In these embodiments, the platform services component 2.12 also incorporates the secure gateway (shown in FIG. 1) and platform services components (shown in FIG. 1) on one device. The platform services component 2.12 connects functionality of the existing enterprise services 1.20-1.80 in the green zone across firewall 1.16 to the user device 2.1. Once connected, the user device 2.1 can access the application server 1.80, file server 1.70, document server 1.60, Second Factor authentication server 1.50, Mail server 1.40 and Active directory 1.30, etc. and Virtual Windows sessions 1.20.

Authentication and Provisioning Functionality

Figure 3:
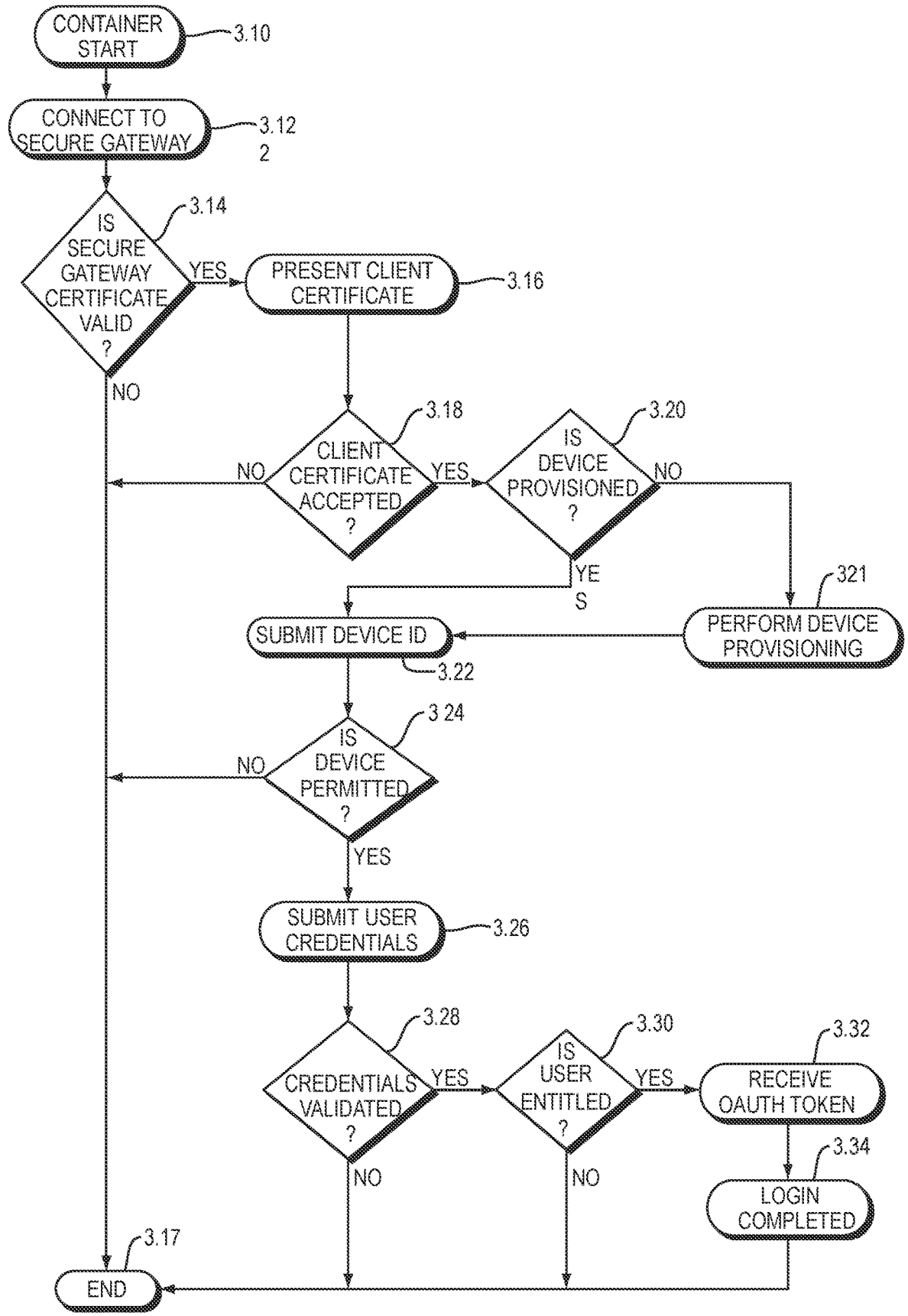
FIG. 3 is a flowchart for an exemplary process for facilitating provisioning for container-based management at a user device based on session keys obtained from a network service, in accordance with one or more embodiments of the invention.

FIG. 3 is a flowchart for an exemplary process for facilitating provisioning for container-based management at a user device based on session keys obtained from a network service, in accordance with one or more embodiments of the invention.

At step 3.10, a user launches the container at user device 1.1.

At step 3.12, the container connects to the secure gateway 1.8. The secure gateway 1.8 then establishes a low level connection with the container. The container transmits a secure gateway certificate to the secure gateway 1.8.

At step 3.14, the secure gateway 1.8 validates the secure gateway certificate of the container.

If the validation fails, at step 3.17 the secure gateway 1.8 denies access to the container and login ceases.

If validation of the secure gateway certificate succeeds, at step 3.16, the device presents the client certificate to the secure gateway 1.8.

At step 3.18, the secure gateway 1.8 performs validation of the client certificate as to whether the client is known and trusted.

If the validation fails, at step 3.17, the secure gateway 1.8 denies access to the container and login ceases.

If validation of the certificate succeeds, at step 3.20, the container determines if the device is provisioned.

If the device is not provisioned, at step 3.21, user device 1.1 performs device provisioning. Device provisioning is described in greater detail in FIG. 4.

If the device is provisioned, at step 3.22, the container submits a device identifier (device ID) and user credential (e.g., username and password) to the secure gateway 1.8.

At step 3.24, the secure gateway 1.8 performs validation (e.g., by consulting the platform services component 1.12) of the device ID to determine if the device is permitted to access the enterprise services 1.20-1.80.

If the validation fails, at step 3.17, the secure gateway 1.8 denies access to the container and login ceases.

If the validation of the device ID succeeds, at step 3.30, the secure gateway 1.8 consults the platform services component 1.12 with the user credentials.

If the validation of the user credentials fails, at step 3.17, the secure gateway 1.8 denies access to the container and login ceases.

If user credentials are valid, at step 3.32, the secure gateway 1.8 determines that the user is entitled to access the services 1.20-1.80 and assigns an authorization token. In subsequent data requests, the user device 1.1 or container attaches the authorization token to every data request to the enterprise services 1.20-1.80 to validate request authenticity.

Figure 4:
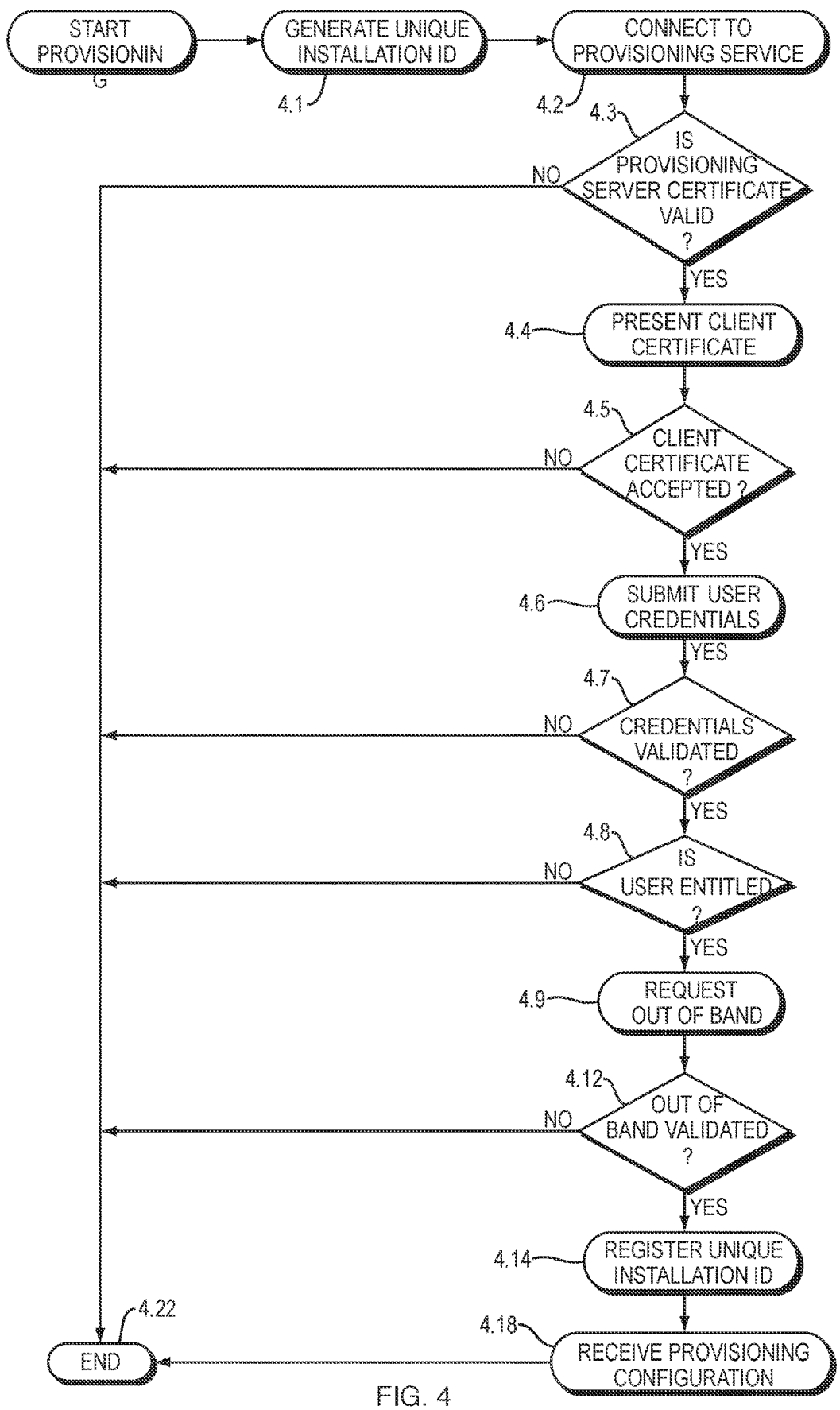
FIG. 4 is a flowchart of a process for provisioning a user device, in accordance with at least one embodiment of the invention.

FIG. 4 is a flowchart of a process for provisioning a user device, in accordance with at least one embodiment of the invention.

At step 4.1, the user device 1.1 generates a unique installation identifier (installation ID) that corresponds to the device at time of installation. If a user uninstalls the container and reinstalls the container again, the provisioning process is repeated and the user device 1.1 is treated as a new device with a different installation ID.

At step 4.2, the user device 1.1 connects to the provisioning service (e.g., the secure gateway 1.8) to initiate generation of an installation ID.

At step 4.3, the user device 1.1 presents a provisioning certificate to the provisioning service.

If the provisioning certificate is not valid, the process skips to step 4.22 and the provisioning process ends.

If the provisioning certificate is valid, at step 4.4, the user device 1.1 presents a client certificate to the provisioning service.

If the client certificate is not valid, the process skips to step 4.22 and the provisioning process ends.

If the client certificate is accepted, at step 4.6, the user device 1.1 presents user credentials to the provisioning service.

At step 4.7, the provisioning service consults platform services component 1.12 to determine if the user credentials are valid.

If the user credentials are not valid, the process skips to step 4.22 and the provisioning process ends.

If the user credentials are accepted, at step 4.8, the provisioning service platform services component 1.12 to determine if the user is entitled to use the container.

If the user is not entitled, the process skips to step 4.22 and the provisioning process ends.

If the user is entitled, at step 4.9, the provisioning service sends a request for out of band authentication.

If out of band validation is not valid, the process skips to step 4.22 and the provisioning process ends.

If out of band validation is accepted, at step 4.14, the platform services component 1.12 registers the unique installation ID as known and trusted device.

At step 4.18, the provisioning service sends a provisioning configuration to the container. After step 4.18, the provisioning process is complete.

Container Functionality

Figure 5:
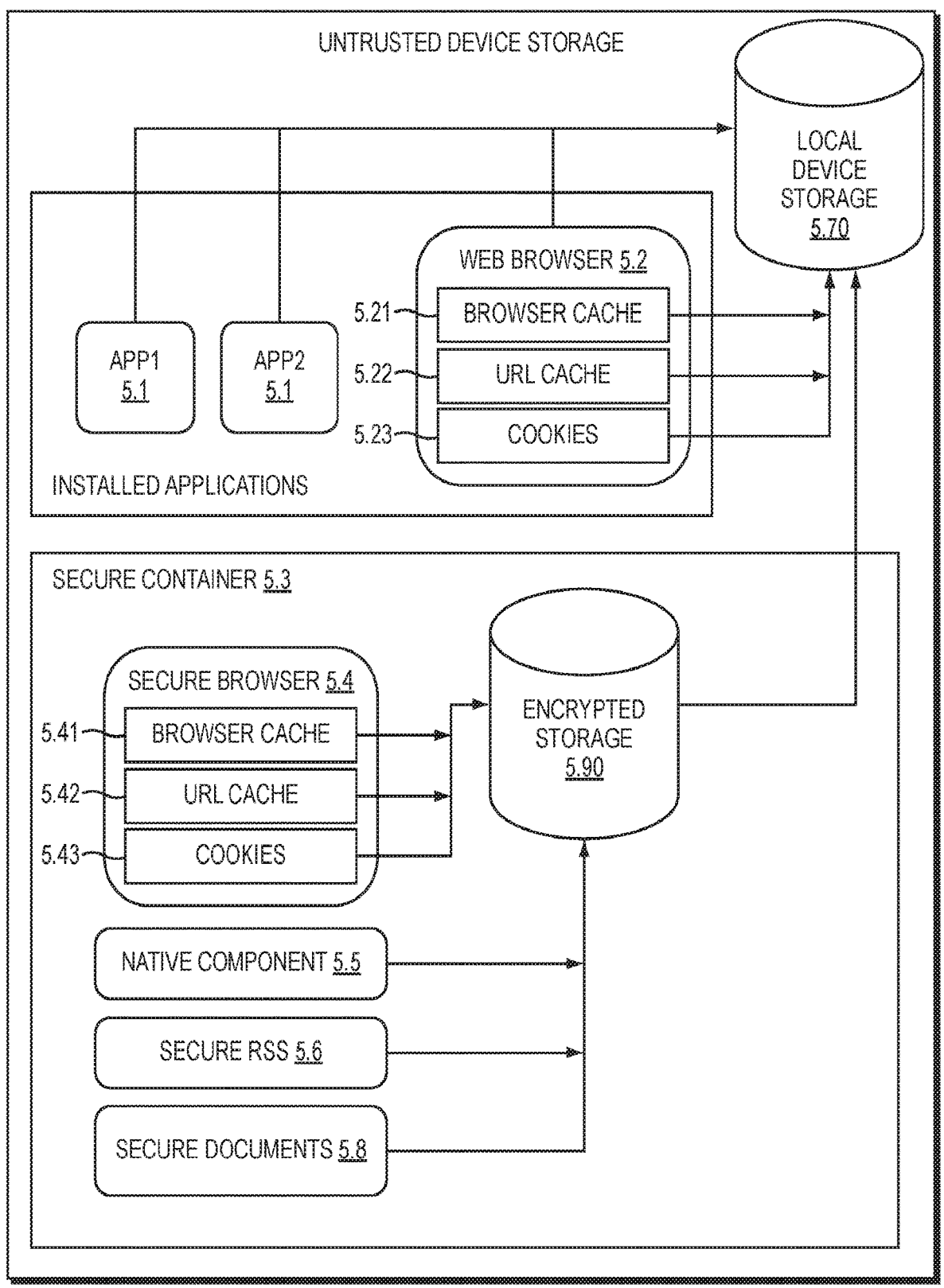
FIG. 5 is a schematic diagram of data storage architecture on an exemplary user device (e.g., an un-secured and un-trusted device), in accordance with one or more embodiments of the invention.

FIG. 5 is a schematic diagram of data storage architecture on an exemplary user device (e.g., an un-secured and un-trusted device), in accordance with one or more embodiments of the invention.

In some embodiments, the user device 1.1 includes installed applications 5.1 and web browser 5.2. The web browser 5.2 includes a browser cache 5.21, a uniform resource locator (URL) cache 5.22 and cookies 5.23.

In some embodiments, the user device 1.1 includes a secure container 5.3. The secure container 5.3 includes a secure browser 5.4; a secure native component 5.5; a secure RSS viewer 5.6; and a secure documents viewer 5.8. The data provided by a user or an enterprise service 1.20-1.80 are placed in encrypted storage 5.9, which is then stored in the local device storage 5.7. In some embodiments, encrypted storage 5.9 comprises a set of componentry including: Encrypted File Storage, Encrypted Database, Secure Storage Encryption. The Encrypted Database is based on SQL Cypher and is created upon user login. Encryption may be done using AES-256 CBC using a derived 256-bit key based on user id and password, combined with 128 bit random salt, derived with 10,000 (configurable) PBKDF-2 iterations of SHA512 HMAC.

In some embodiments, native and web applications store respective data only within Secure Storage. Browser cache is stored in the Encrypted File Storage. All downloaded attachments and files are stored in the Encrypted File Storage By implementing any of these embodiments, the user device 1.1 can secure all aspects of data handling while the data is in motion and at rest.

Figure 6:
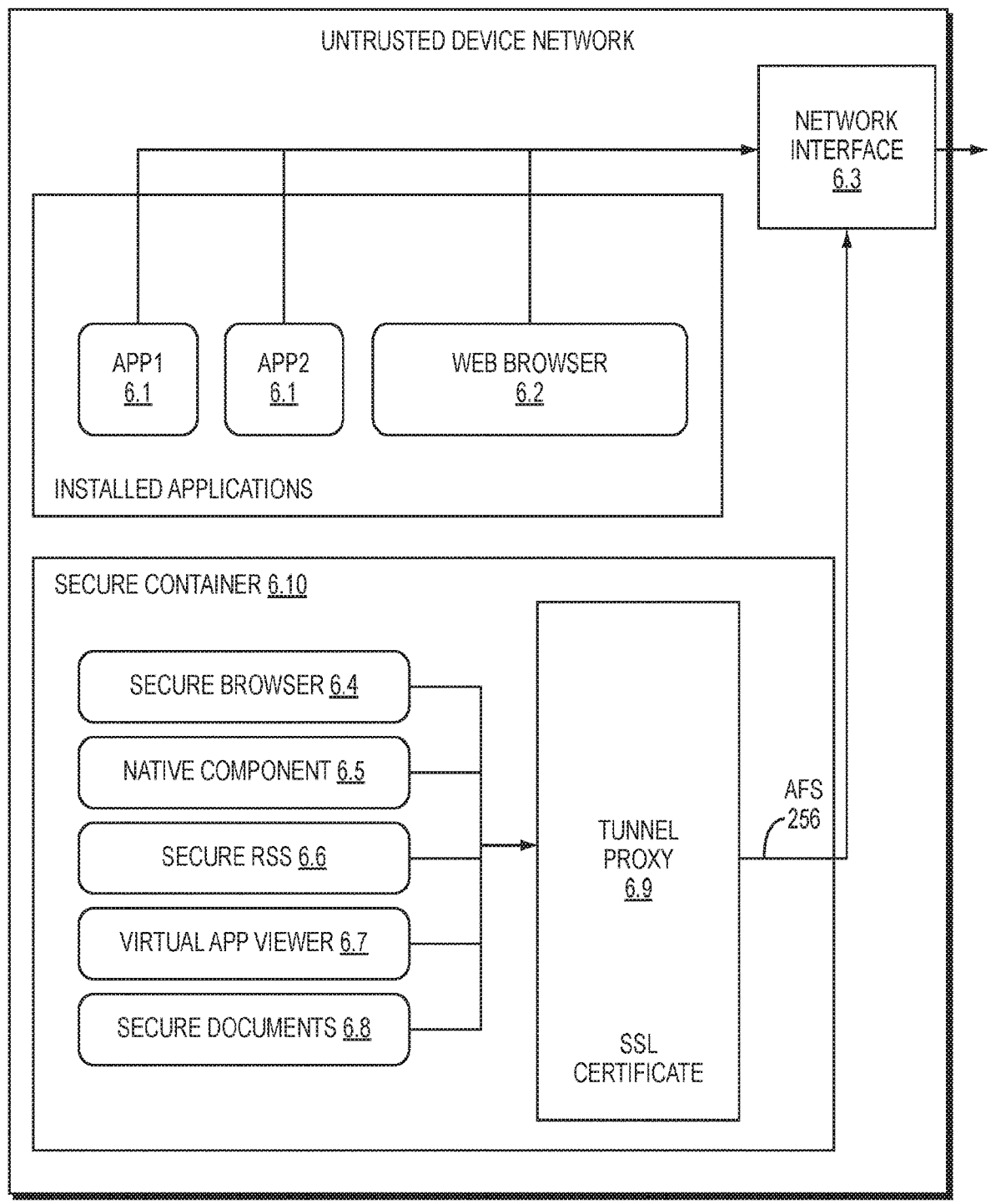
FIG. 6 is a schematic diagram of a network security architecture on an exemplary user device, in accordance with one or more embodiments of the invention.

FIG. 6 is a schematic diagram of a network security architecture on an exemplary user device, in accordance with one or more embodiments of the invention. In FIG. 6, the user device 1.1 is an untrusted device. To provide security of data, the user device 1.1 manages authentication of secure network resources in regards to the network interface. In some embodiments, the user device 1.1 includes installed applications 6.1 and web browser components 6.2. Installed application 6.1 and web browser component 6.2 utilize the device network interface 6.3 to exchange data with any of enterprise services 1.20-1.80.

In some embodiments, the user device 1.1 includes a secure container 6.10 that manages a secure browser 6.4; native component 6.5; secure RSS 6.6; virtual App viewer 6.7 and secure documents 6.8 are encrypted through a proxy tunnel 6.9 applying a SSL certificate. Any data transmitted from the container is encrypted through the proxy tunnel 6.9 and then bundled to the network interface 6.3 for routing to any of the other components of system 100.

Figure 7:
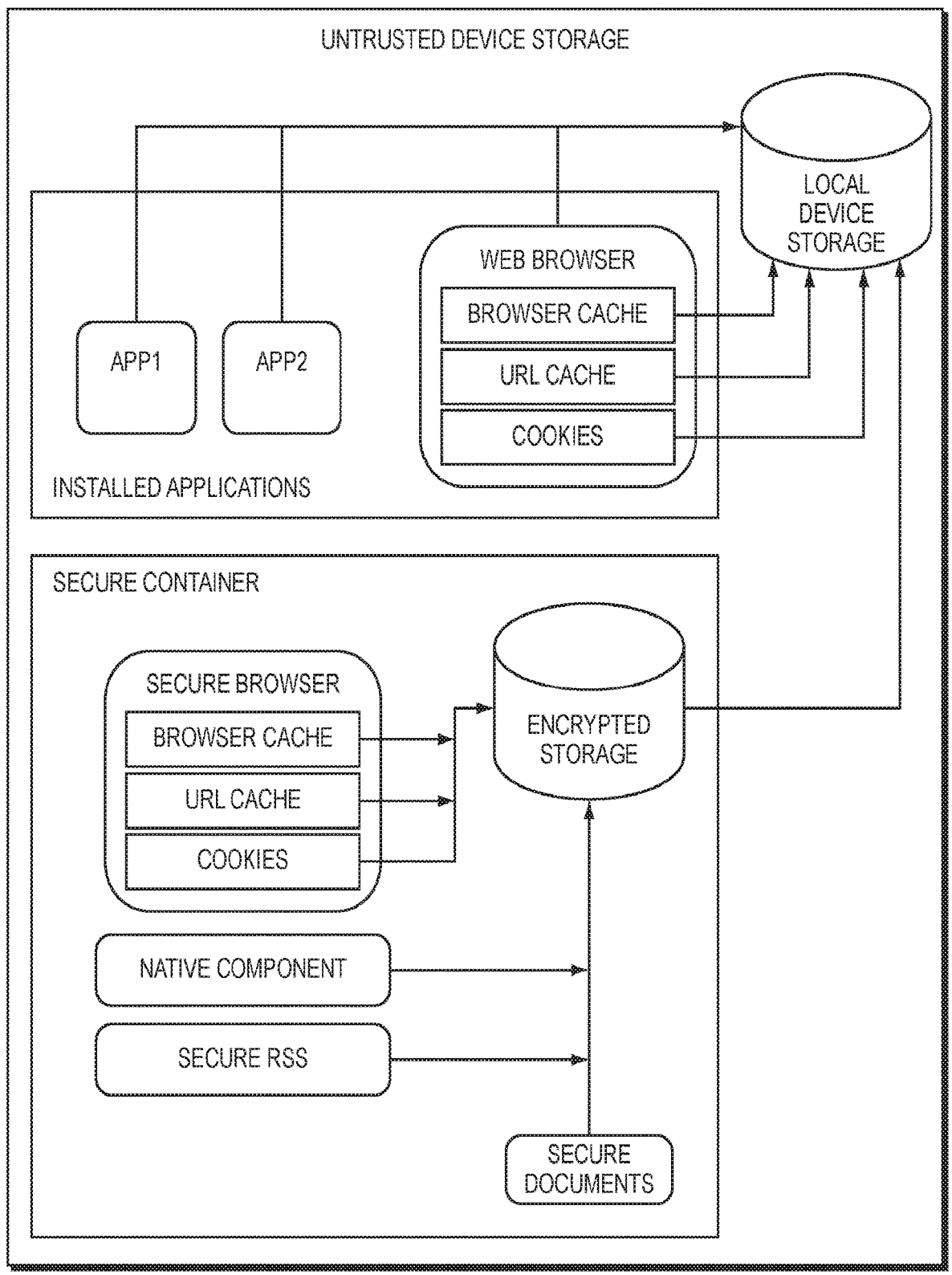
FIG. 7 is a schematic diagram of the devices storage security and how is manages authentication of secure network resources on the un-trusted, un-secured edge device, in accordance with one or more embodiments of the invention.

FIG. 7 is a schematic diagram of the devices storage security and how is manages authentication of secure network resources on the un-trusted, un-secured edge device, in accordance with one or more embodiments of the invention.

Container User Interfaces

Figure 8A:
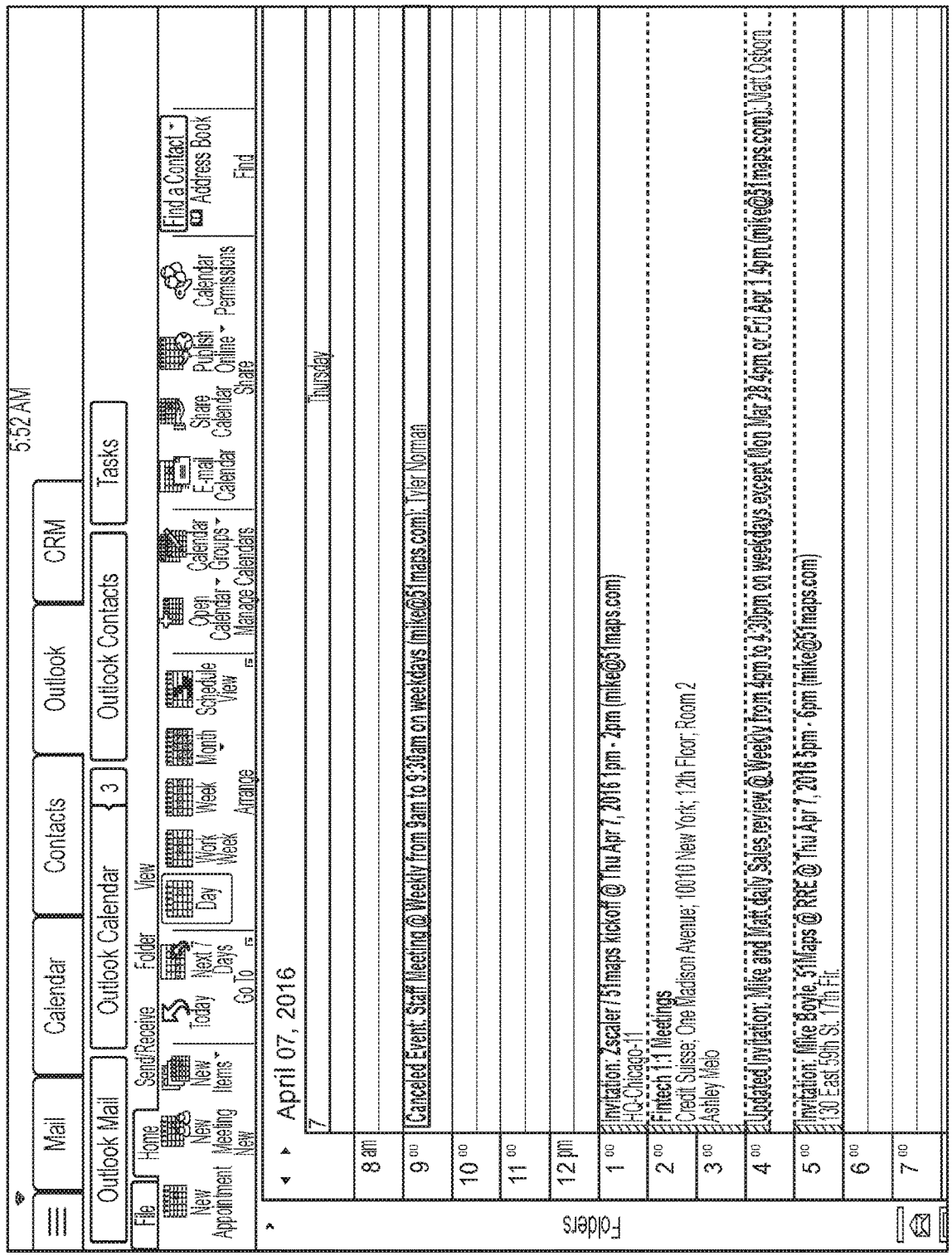
Figure 8B:
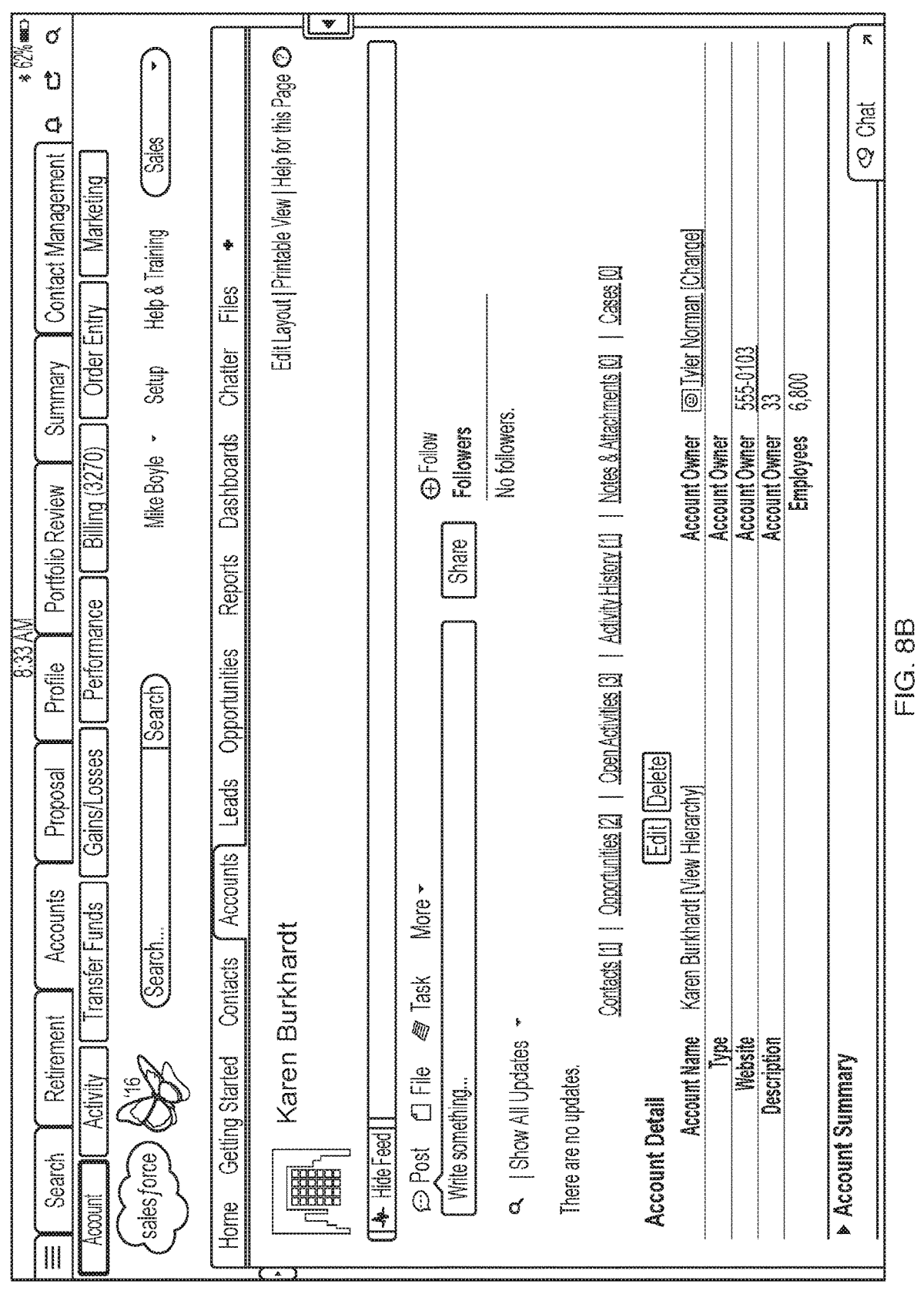
Figure 8C:
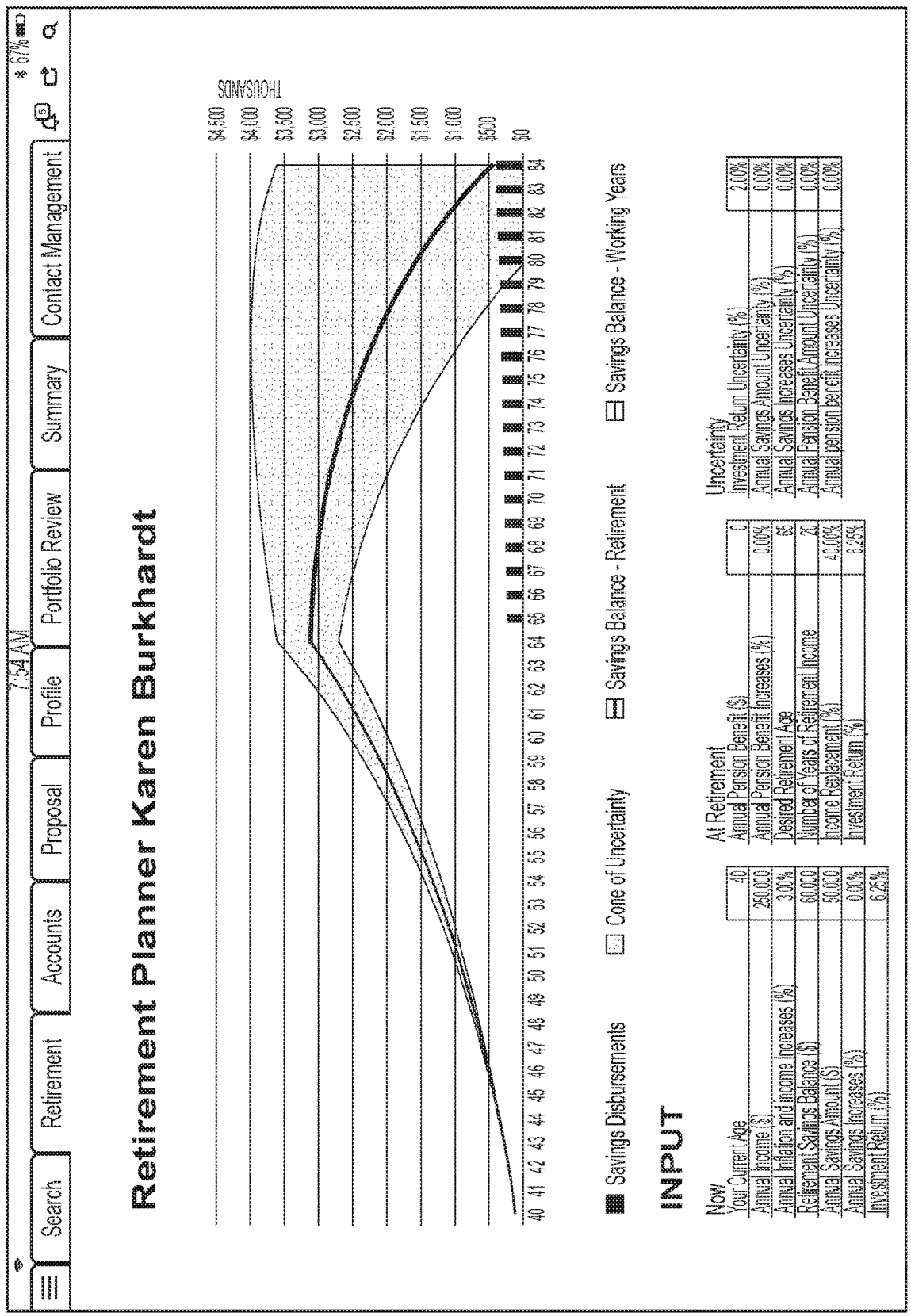
Figure 8D:
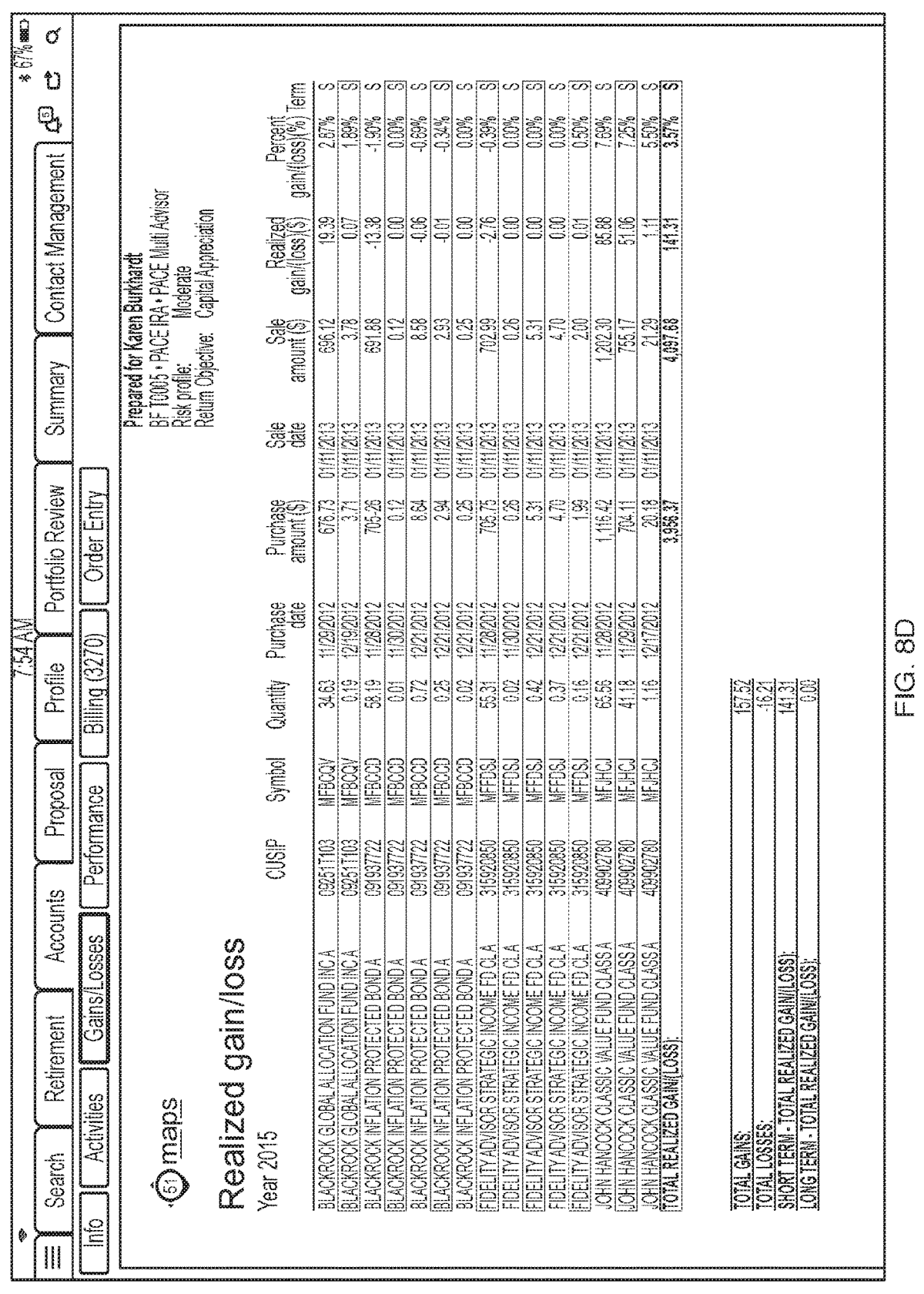
Figure 8E:
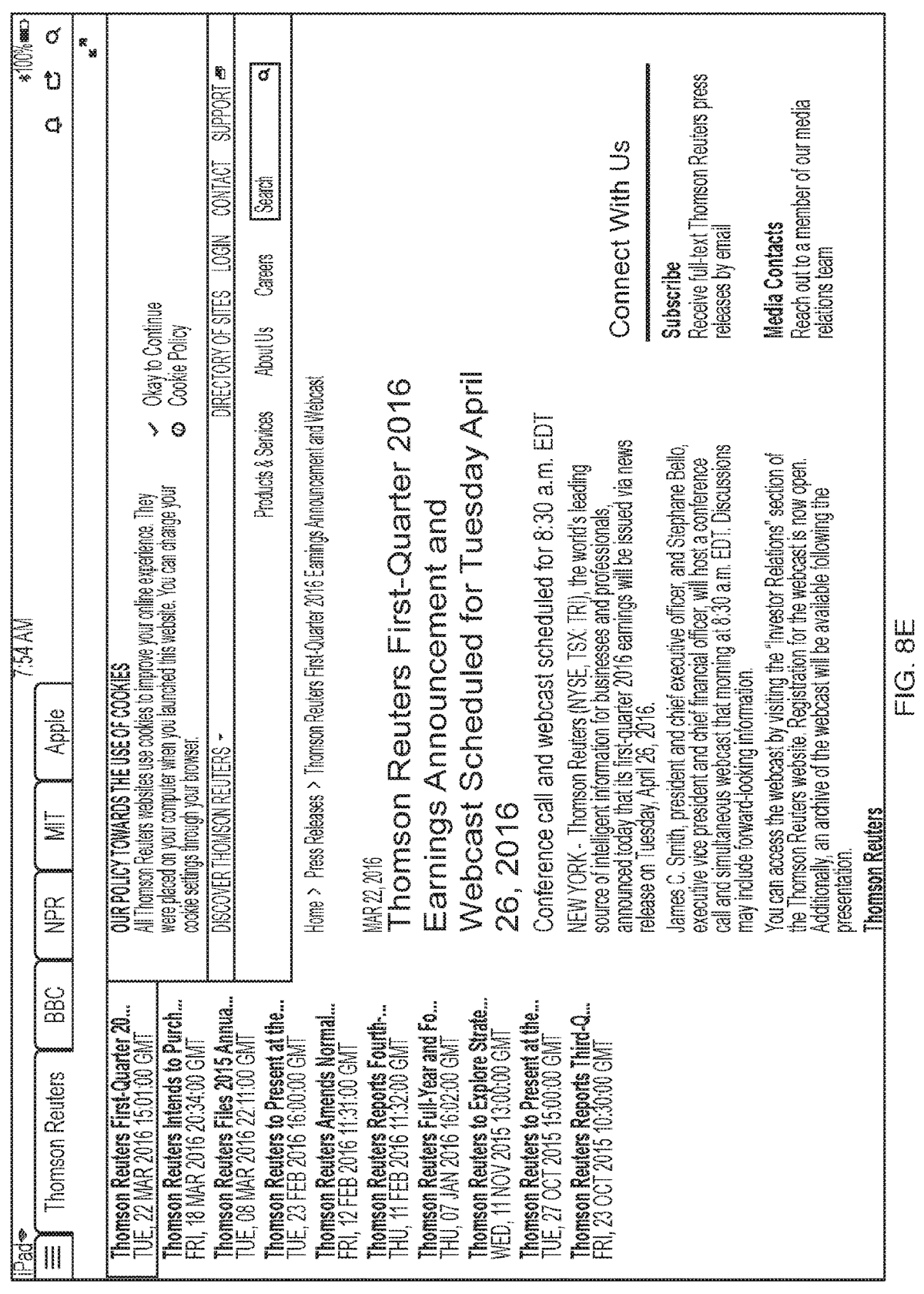
Figure 8G:
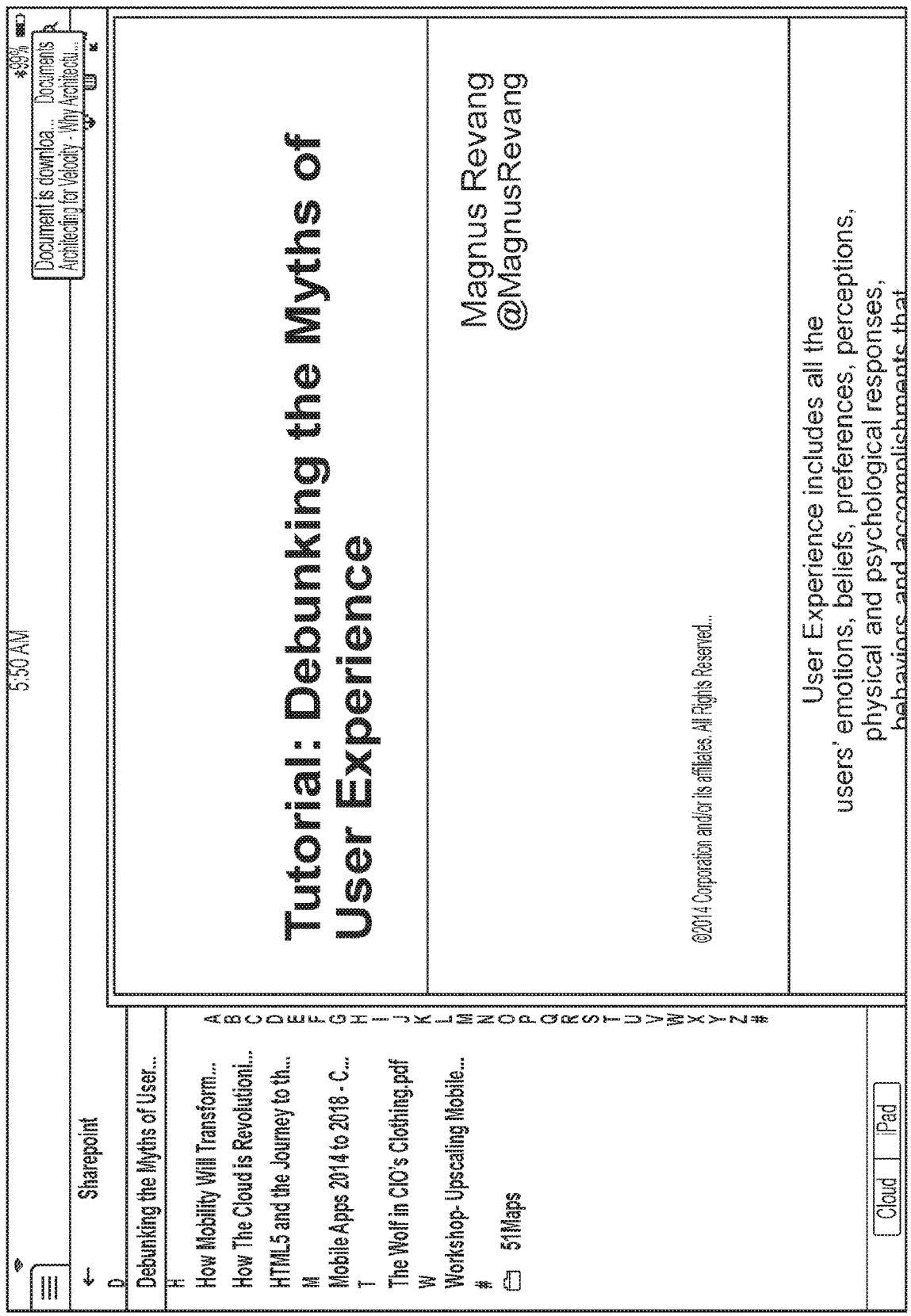
Figure 8H:
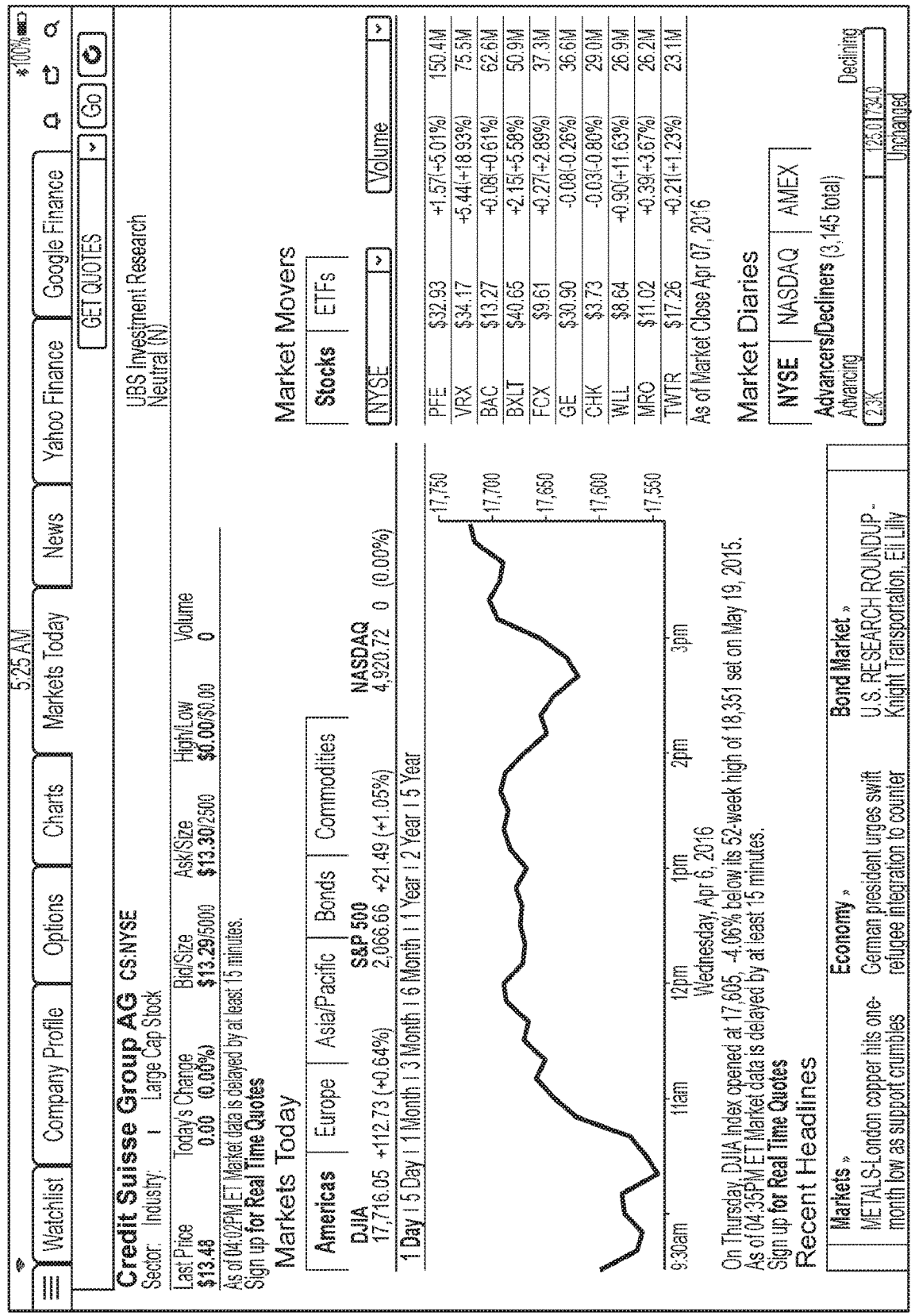

FIGS. 8A-8H illustrates exemplary screenshots of the container, in accordance with at least some embodiments of the invention. FIG. 8A is an exemplary screenshot of a MICROSOFT® Outlook client executed using the container of user device 1.1. FIG. 8B is an exemplary screenshot of a SaaS application executed using the container of user device 1.1. FIG. 8C is an exemplary screenshot of a PDF viewer executed using the container of user device 1.1. FIG. 8D is an exemplary screenshot of a custom WINDOWS® application executed using the container of user device 1.1 (where user device 1.1 is an IPAD® running iOS). FIG. 8E is an exemplary screenshot of a secure RSS Feed viewer executed using the container of user device 1.1. FIG. 8F is an exemplary screenshot of a mainframe viewer executed using the container of user device 1.1. FIG. 8G is an exemplary screenshot of a secure document viewer executed using the container of user device 1.1. FIG. 8H is an exemplary screenshot of a third party web application viewer executed using the container of user device 1.1.

Exemplary Implementations

Figure 9:
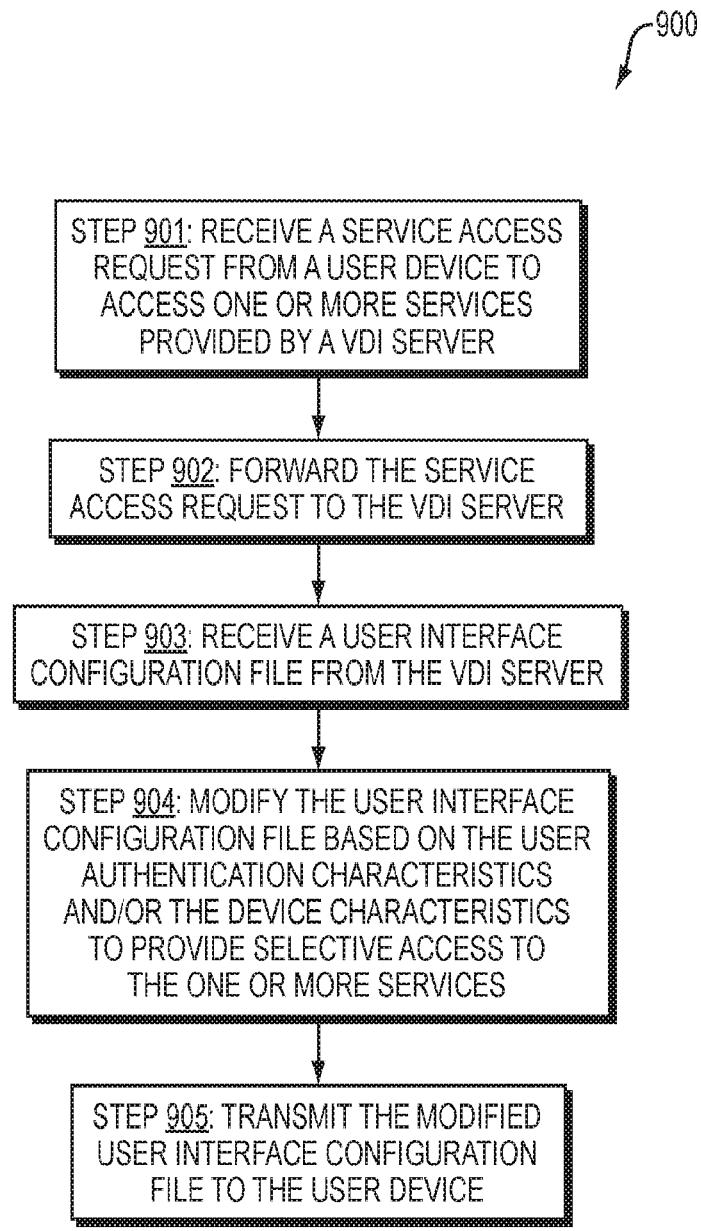
FIG. 9 is a flow chart of a method of selectively providing a customized graphical user interface to a user device, in accordance with one or more embodiments of the invention.

FIG. 9 is a flow chart of a method of selectively providing a customized graphical user interface to a user device 1.1, in accordance with one or more embodiments of the invention.

At step 901, the platform services component 1.12 receives a service access request from a user device 1.1 to access one or more services provided by a VDI server 1.20. In some embodiments, the request includes i) user authentication characteristic(s) of a user (e.g., role-type or role-level) of the second computing device and/or ii) device characteristic(s) of the user device 1.1 (e.g., display form factor, operating system), as described herein.

At step 902, the platform services component 1.12 forwards the service access request to the VDI server 1.20.

At step 903, the platform services component 1.12 receives a user interface configuration file from the VDI server 1.20.

At step 904, the platform services component 1.12 modifies the user interface configuration file based on the user authentication characteristics and/or the device characteristics to provide selective access to the one or more services;

At step 905, the platform services component 1.12 transmits the modified user interface configuration file to the user device 1.1, wherein the modified user interface configuration file is configured to be executed by the user device 1.1 to enable the user device 1.1 to display a modified user interface that provides selective access to the one or more services.

Additional Embodiments

In some embodiments, the container includes a comprehensive management portal (Portal) for configuration, set up, management, and troubleshooting. In some embodiments, reporting and detailed auditing tools are also built into Portal. The audit tools comprise a set of data tracking all activity from the container and the platform services component 1.12 which tracks this activity in real time across all devices for all users simultaneously. This information is then provided to the Enterprise to drive further data mediation and contextualization within the enterprise applications embodied within the product. This data us written to the data store of an enterprise's choice to be utilized in analytical and tracking activities around fraud, mediations, process improvement, productivity enhancements and other functions of value to the enterprise.

By securing any un-trusted, un-secure, and un-managed device, the system 100 also provides a solution to the management and security challenges within a corporate network. A typical desktop inside a large corporation consists of the Operating System, Browser, and a multitude of secured and un-secured, custom and off-the-shelf applications. The management process for such a desktop is extremely complex and expensive. Migrating to new versions of the browser, and O/S can require retesting and rewriting of hundreds of complex line-of-business applications. Security of such a desktop is not guaranteed, and each application and application vendor do something different for securing data or network traffic, while some don't secure either one. In some embodiments, the system 100 enables an IT department to centralize all the data and resources that need to be secured within a data center, while encrypting all communications for existing desktop applications over a single HTTPS channel secured by two-way certificate pinning, and to reduce the need to upgrade, manage, and maintain geographically distributed desktops. This allows the IT department to also utilize data security standards e.g. NIST to apply policy to specific application data fields or pages which allows for a universal application of said security standards even for applications that were never developed with those standards in mind.

One embodiment ensures that there are access control functions available at the application level for a rich set of fine-grained objects—even more so that might have been originally implemented in the application. Documents that need to viewed are done securely and without leaving the documents on the device unless authorized.

In some embodiments, customized application views can be provided depending on context and security requirements—it is possible with the system 100 to implement finer grain object access control than provided in the original application.

In some embodiments, contextual multifactor escalation is a unique feature—it enables access control on top of fine-grained features and functions within the container. For example, to gain access to client data, the user can be prompted for additional authentication. All of which can be configured in the management portal without change to the application itself.

One embodiment provides a system for secure access to corporate resources, comprising: a container application installed on at least one user's device; authenticated using existing corporate credentials system to the corporate network; providing access to the corporate intranet resources from an untrusted device; establishing a secure HTTPS connection between the device and corporate network server using two-way certificate pinning; collecting and securely passing user credentials to the corporate authentication system; retrieving policy and placement configuration specific to the logged on user; enforcing configured policies through container policy enforcement system.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method of selectively providing a customized graphical user interface, the method comprising:
   at a first computing device:
      receiving a service access request from a client device to access one or more services provided by a virtual desktop infrastructure server, the service access request including an authentication characteristic of a user of the client device and computing device characteristics of the client device;
      after receiving the service access request, forwarding the service access request to the virtual desktop infrastructure server;
      after forwarding the service access request to the virtual desktop infrastructure server, receiving a user interface configuration file from the virtual desktop infrastructure server, wherein the user interface configuration file is configured to be executed by the client device to enable the client device to display a user interface that provides access to the one or more services;
      after receiving the user interface configuration file from the virtual desktop infrastructure server, modifying, at the first computing device before transmitting to the client device, the user interface configuration file received from the virtual desktop infrastructure server based on the user authentication characteristics and the computing device characteristics of the client device, to provide selective access to the one or more services;
      after modifying the user interface configuration file received from the virtual desktop infrastructure server, transmitting the modified user interface configuration file to client device, wherein the modified user interface configuration file is configured to be executed by the client device to enable the client device to display a modified user interface that provides selective access to the one or more services.

2. The method of claim 1, wherein the computing device characteristics include at least one of: i) an operating system of the client device and ii) display screen form factor characteristics of the client device.

3. The method of claim 1, wherein the first computing device receives the service access request and transmits the modified user interface configuration filed to the client device using a secure hypertext transfer protocol (HTTPS).

4. The method of claim 1, further comprising:
   displaying, at the client device using a secure container, the modified user interface that provides selective access to the one or more services.

5. The method of claim 4, further comprising:
   storing, at a local storage of the client device, data provided by the user via the modified user interface; and
   accessing, at the local storage of the client device, data requested by the user via the modified user interface, wherein the local storage is encrypted.

6. The method of claim 4, further comprising:
   executing an application that displays a local application user interface at the client device; and
   displaying the local application user interface at the client device using the secure container.

7. The method of claim 6, further comprising:
   storing, at a local storage of the client device, data provided by the user via the local application user interface; and
   accessing, at the local storage of the client device, data requested by the user via the local application user interface,
   wherein the local storage is encrypted.

8. The method of claim 1, wherein providing selective access the one or more services including at least one of: i) restricting access to a feature of the one or more services and ii) restricting access to at least one service of the one or more services.

9. The method of claim 1, further comprising:
   invoking an encrypted session between the first computing device and the client device by providing an encrypted session key to the client device, wherein the encrypted session key is unique to the encrypted session.

10. The method of claim 9,
    storing, at a local storage of the client device using the encrypted session key, data provided by the user via the modified user interface; and
    accessing, at the local storage of the client device using the encrypted session key, data requested by the user via the modified user interface.

11. The method of claim 9, further comprising:
    deleting the encrypted session key upon discontinuation of the encrypted session.

12. A non-transitory computer readable storage medium having stored thereon computer-executable instructions which, when executed by a processor at a first computing device, perform the steps of claim 1.

13. A system comprising:
    at a first computing device:
       one or more memory units each operable to store at least one program; and
       at least one processor communicatively coupled to the one or more memory units, in which the at least one program, when executed by the at least one processor, causes the at least one processor to perform the steps of claim 1.

* * * * *